United States Patent [19]

Kikugawa

[11] Patent Number: 4,746,847
[45] Date of Patent: May 24, 1988

[54] CONTROL SYSTEM FOR A STEPPING MOTOR

[75] Inventor: Noriyuki Kikugawa, Yokohama, Japan

[73] Assignee: Canon Kabushiki Kaisha, Tokyo, Japan

[21] Appl. No.: 863,072

[22] Filed: May 14, 1986

[30] Foreign Application Priority Data

May 17, 1985 [JP] Japan .................................. 60-104007

[51] Int. Cl.$^4$ ............................................. H02P 8/00
[52] U.S. Cl. ................................... 318/696; 318/685
[58] Field of Search ................................. 318/696, 685

[56] References Cited

U.S. PATENT DOCUMENTS

| | | | |
|---|---|---|---|
| 3,727,121 | 4/1973 | Rich | 318/696 |
| 4,019,110 | 4/1977 | Gerry | 318/696 |
| 4,242,623 | 12/1980 | Oudet et al. | 318/696 |
| 4,242,624 | 12/1980 | Schalk et al. | 318/696 |
| 4,258,622 | 3/1981 | Estrabaud et al. | 101/93.01 |
| 4,329,635 | 5/1982 | Reilly | 318/696 |
| 4,353,021 | 10/1982 | Watanabe et al. | 318/696 |
| 4,389,605 | 6/1983 | Noda | 318/696 |
| 4,417,189 | 11/1983 | Overfield | 318/696 |
| 4,429,268 | 1/1984 | Yajima et al. | 318/696 |
| 4,438,379 | 3/1984 | Chiang et al. | 318/685 |
| 4,464,071 | 9/1984 | Sakakibara | 400/144.2 |
| 4,469,995 | 9/1984 | Chiang et al. | 318/685 |
| 4,479,723 | 10/1984 | Shida | 368/157 |
| 4,484,124 | 11/1984 | White et al. | 318/696 |
| 4,513,236 | 4/1985 | Kikenkawa et al. | 318/696 |
| 4,550,279 | 10/1985 | Klein | 318/696 |
| 4,556,836 | 12/1985 | Antognini | 318/696 |

FOREIGN PATENT DOCUMENTS

| | | |
|---|---|---|
| 0068802 | 1/1983 | European Pat. Off. . |
| 2742932 | 12/1979 | Fed. Rep. of Germany . |
| 3221561 | 12/1983 | Fed. Rep. of Germany . |
| 59-155072 | 9/1984 | Japan . |

OTHER PUBLICATIONS

ETZ-B Bd., 24, (1972), H. 12, pp. 290-294, "Digitaler Antrieb Schrittmotor".

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A control system for a stepping motor comprises flowing an electric current to a plurality of phases in succession and driving the stepping motor, and flowing a loop current to a coil of the phase which is not concerned in the driving of the stepping motor when the deceleration area of the stepping motor is reached, thereby obtaining a braking force.

6 Claims, 5 Drawing Sheets

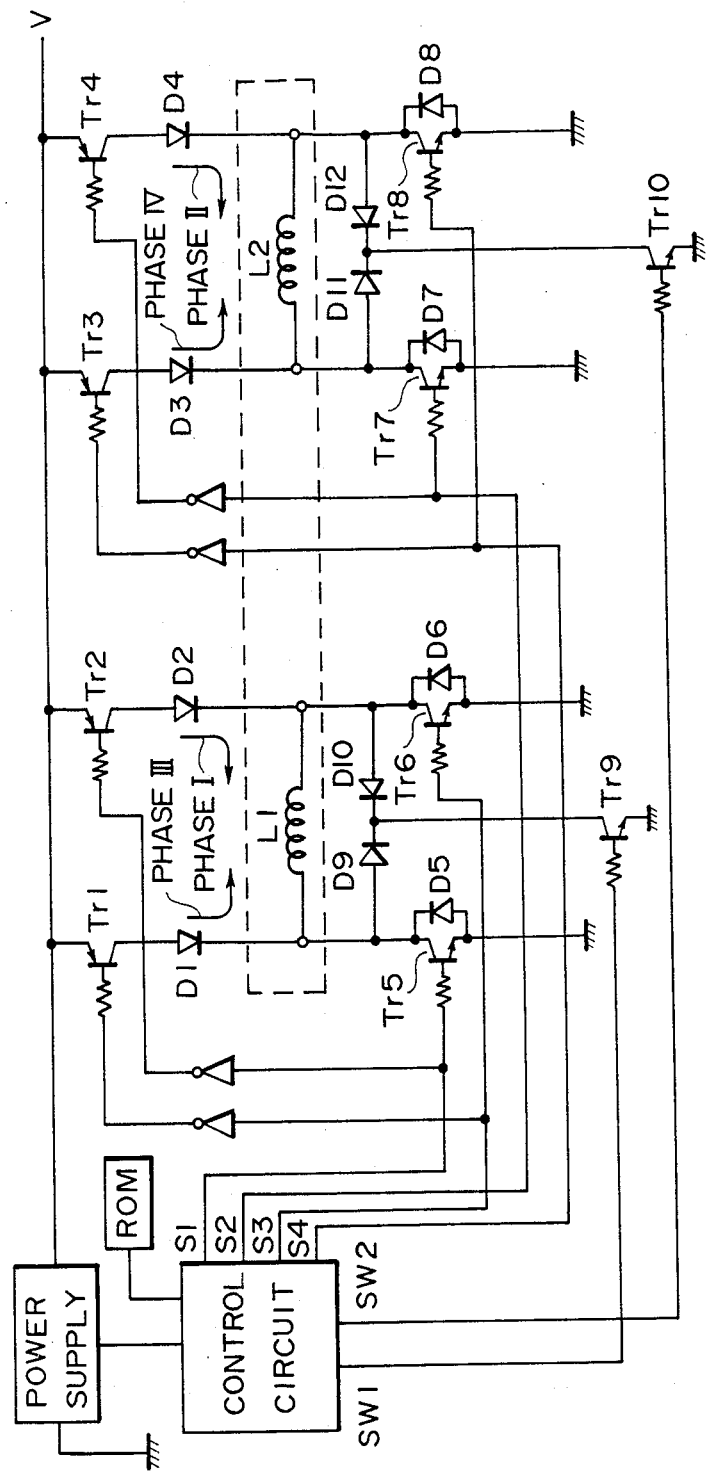
F I G. 1

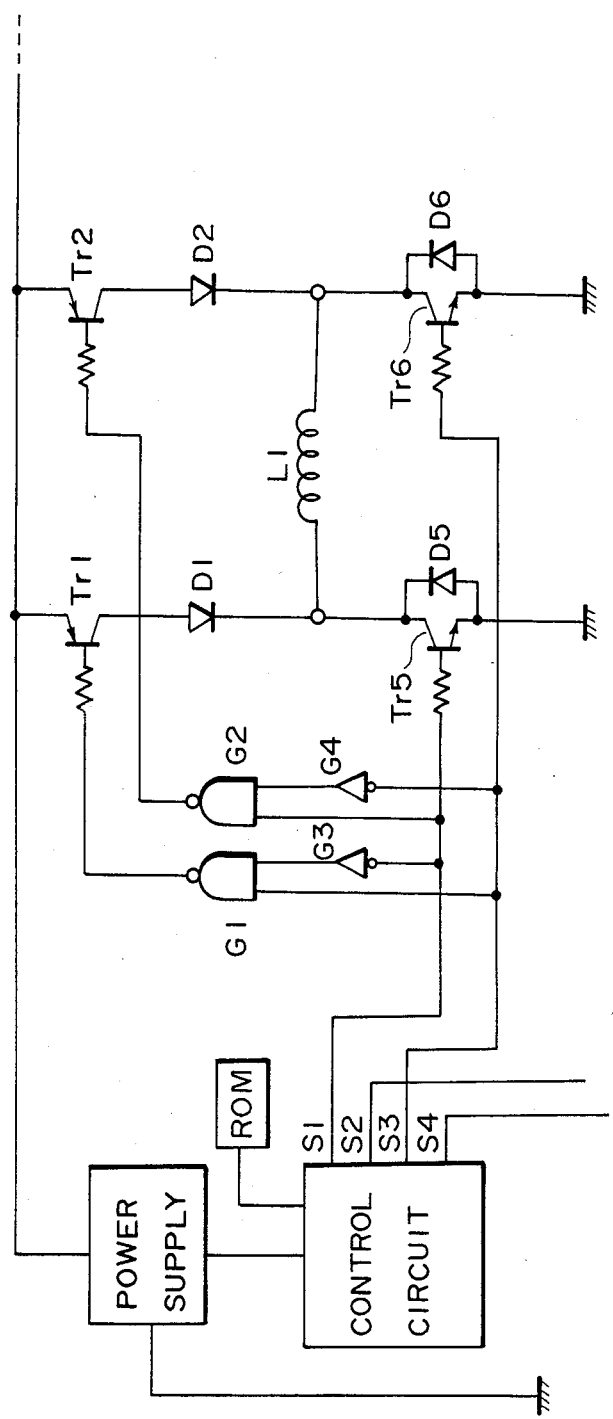
F I G. 4

CONTROL SYSTEM FOR A STEPPING MOTOR

BACKGROUND OF THE INVENTION

1. Field of the Invention

This invention relates to a control system for a stepping motor.

2. Description of the Prior Art

When a stepping motor shifts from its moving state to its stopped state, the mover of the stepping motor usually effects attenuation vibration near the objective stable point and becomes stationary. In order to shorten the time until the mover stops via this attenuation vibration, there has heretofore been proposed a system in which the kinetic energy of the mover when it has reached the stable point is brought close to 0 by manipulating the excitation phase or the excitation time and thereby the vibration is quickly brought to a close.

Such a conventional system, however, can hardly obtain the desired result when the load applied to the motor fluctuates and in addition, the mode in which the vibration comes to an end differs greatly each time depending on the irregularity of the torque of the motor itself, and this has led to a problem that where the motor is actually used, the time until the vibration comes to an end (the damping time) must unavoidably be set with a sufficient allowance.

So, where high-speed operation of the motor is required, it has been unavoidable in the conventional system to provide a position detector or the like and construct a close loop control system using the detection output thereof, and this in turn has led to the bulkiness and expensiveness of the control system including the stepping motor.

SUMMARY OF THE INVENTION

It is an object of the present invention to provide a control system for a stepping motor whereby in the deceleration time duration interval of the stepping motor, a loop current is flowed to a coil of a phase which is not concerned in driving, thereby obtaining a braking force.

It is another object of the present invention to provide a stepping motor driving apparatus in which in the deceleration time duration interval of the stepping motor, a closed loop is formed by a coil of a phase to which no electric current is flowed, whereby a braking force can be obtained.

It is still another object of the present invention to provide a stepping motor driving apparatus in which in the deceleration time duration interval of the stepping motor, a closed loop current path including a coil is formed by a switch, whereby a braking force can be obtained.

It is yet still another object of the present invention to provide a stepping motor driving apparatus in which in the deceleration time duration interval of the stepping motor, a closed loop is formed by a current controlling switch, whereby a braking force can be obtained.

BRIEF DESCRIPTION OF THE DRAWINGS

FIG. 1 is a circuit diagram showing an embodiment of the present invention;

FIG. 4 is a circuit diagram showing another embodiment of the present invention.

DESCRIPTION OF THE PREFERRED EMBODIMENTS

The invention will hereinafter be described in detail with reference to the drawings.

Referring to FIG. 1 which shows an embodiment of the present invention, this embodiment exemplarily shows a case where a 4-phase stepping motor is bipolarly driven In FIG. 1, L1 and L2 within a broken line designate the windings (driving coils) of the stepping motor. S1–S4 denote phase signals. Correspondingly to the states of these signals, transistors Tr1–Tr8 are rendered conductive and phases I–IV are driven. D1–D12 designate diodes, and Tr9 and Tr10 denote transistors. Correspondingly to switch signals SW1 and SW2, the transistors Tr9 and Tr10 are respectively rendered conductive.

If, for example, the transistor Tr9 is rendered conductive by the switch signal SW1 being energized when only the phase II is driven by the phase signal S2, no electric current will flow when the mover is stopped, but when the mover is in motion, an electric current will flow through the route of Tr9→ground→D6→L1→D9→Tr9 or the route of Tr9→ground→D5→L1→D10→Tr9 by a counter electromotive force produced in the coil L1. This electric current flows always in a direction to apply a brake to the mover.

A control circuit is comprised of a CPU and puts out signals S1–S4 for rendering transistors Tr5–Tr10 conductive or non-conductive and signals SW1 and SW2.

The specific operation of such a construction will now be described.

Figure 2:
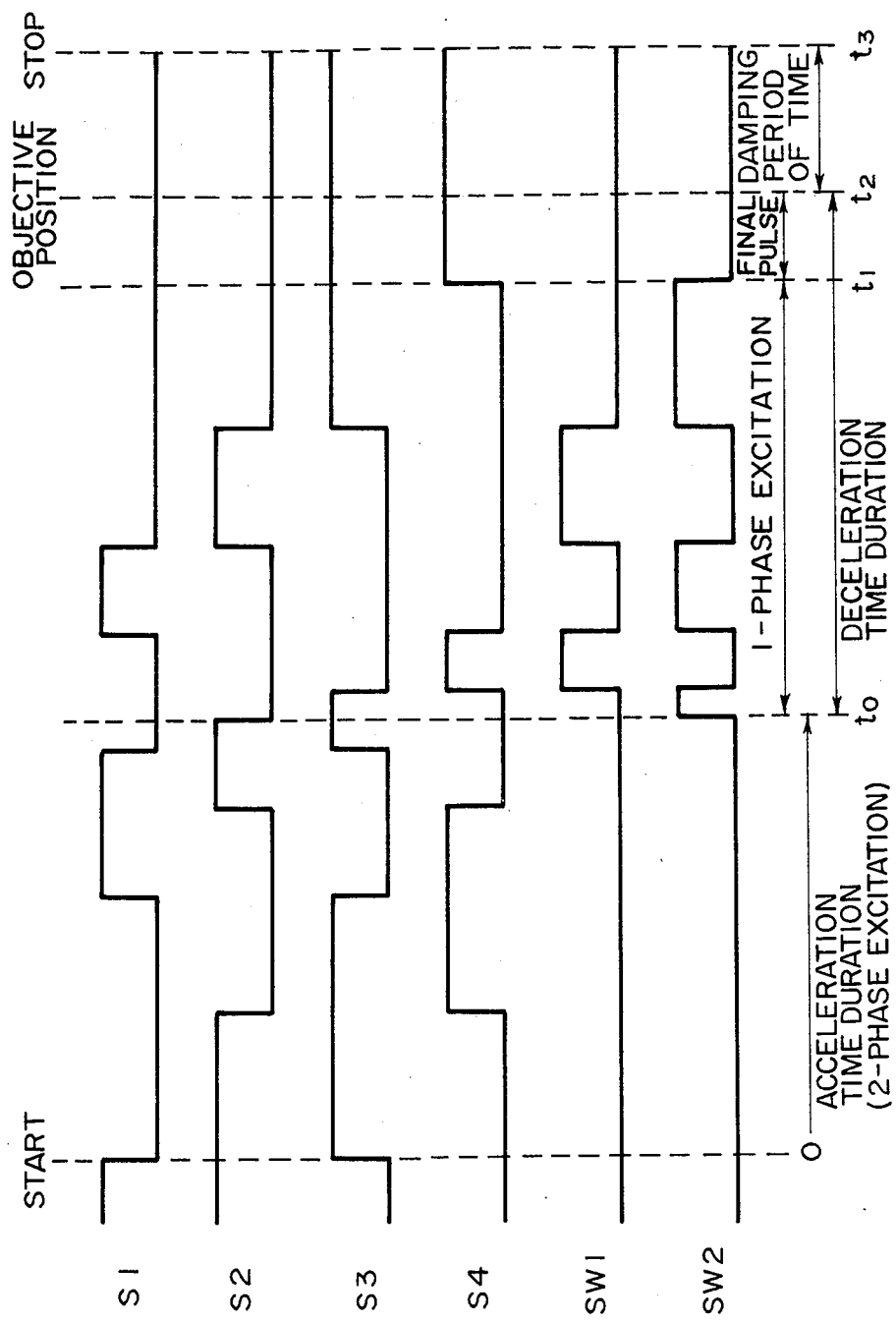
FIG. 2 is a timing chart showing an example of the operation timing of the signal of each portion shown in FIG. 1.

FIG. 2 is a timing chart showing an example of the operation timing of the signal of each portion shown in FIG. 1. Here, let it be assumed that up to time $t_0$ is an acceleration time duration interval and the stepping motor is driven by 2-phase excitation and that the time after time $t_0$ is a deceleration interval. In the deceleration interval from after time $t_0$ to time $t_1$ close to time $t_2$ whereat the objective position is arrived at, 1-phase excitation is effected and the switch associated with the coil which is not driven then is closed. That is, for example, during phase I driving, the switch signal SW2 is switched on, and during phase II driving, the switch signal SW1 is switched on. These switch signals SW1 and SW2 may be produced during the execution of the control procedure of the control device of an instrument using the stepping motor or may be produced by a simple logic circuit using the stop signal of the motor and signals S1–S4. For example, provision may be made of a first OR gate for receiving the inputs of the signals S1 and S3, a second OR gate for receiving the inputs of the signals S2 and S3, a first AND gate for directing the output of the first OR gate and the stop signal, and a second AND gate for directing the output of the second OR gate and the stop signal, and the outputs of the first and second AND gates may be used as the switch signals SW1 and SW2, respectively. The above-described control is performed by a control circuit in accordance with the control program in a ROM.

According to such a construction, in the deceleration time duration interval (from $t_0$ to $t_1$), a loop current $I_0$ flows to either of the coil L1 concerned in phase I and phase III or the coil L2 concerned in phase II and phase IV, and a brake can continue to be applied to the mover (rotor) and therefore, the pulse of the deceleration time duration interval can be made shorter than in the prior art. Also, the loop current $I_0$ is great if the speed of rotation of the rotor is high, and is small if the speed of rotation of the rotor is low and therefore, the braking force by the loop current $I_0$ becomes substantially proportional to the speed of rotation. Thus, even in a case where the load applied to the motor fluctuates, the operation of the rotor is very stable, and the damping time (from $t_2$ to $t_3$) can also be made shorter than in the prior art system, and the damping of the system can be improved.

In the present embodiment, the state of stoppage is 2-phase excitation and therefore, the final pulse from time $t_1$ till time $t_2$ is switched off for both of switch signals SW1 and SW2 and drivers two phases, i.e., phase III and phase IV.

Figure 3:
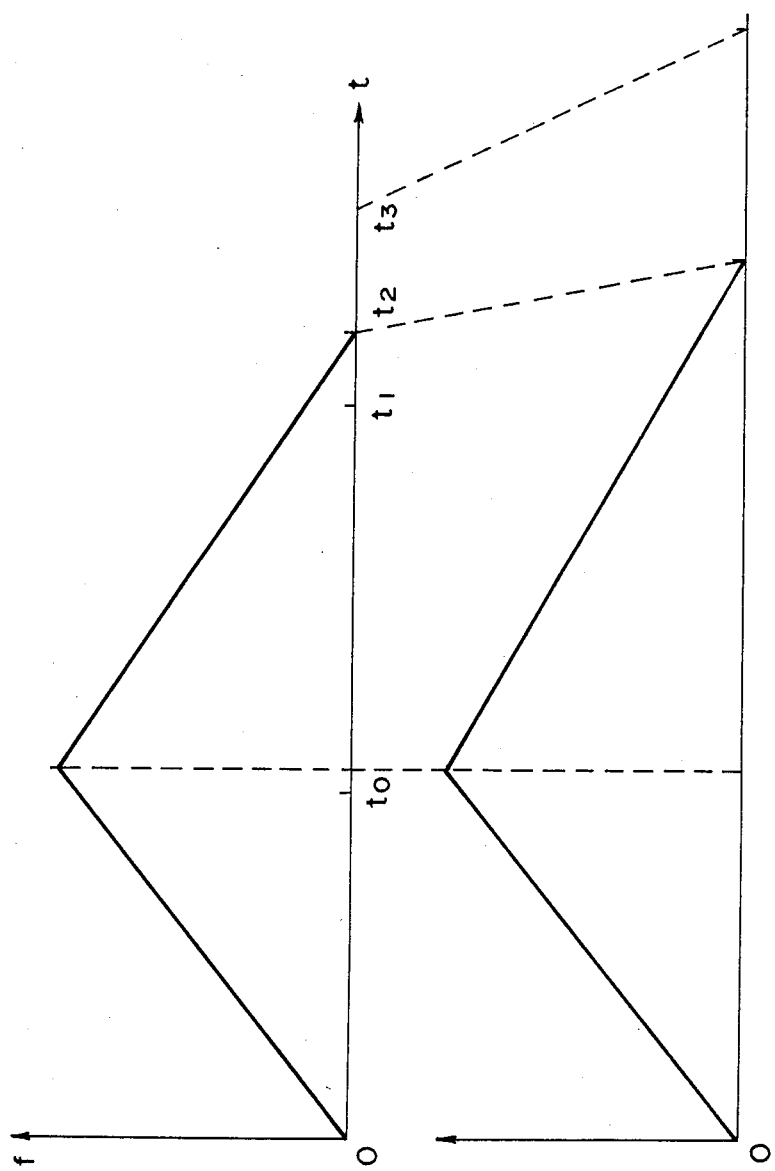
FIGS. 3A and 3B illustrate the driving states of stepping motors by the control system according to the present invention and the system according to the prior art.

FIGS. 3A and 3B respectively show the relations between the time t and the drive frequency f of the stepping motors according to the present embodiment and the prior art. As is apparent from the comparison between these graphs, according to the present embodiment, the time required until the stoppage at the objective position is made shorter than in the prior art.

In the above-described embodiment, the transistors Tr9 and Tr10 are rendered conductive by the use of the switch signals SW1 and SW2, whereby an electric current flows to the idle coil which is not concerned in the phase drive, but this may be accomplished also by using the phase drive signal in the following manner.

FIG. 4 shows another embodiment of the present invention. In FIG. 4, only the construction of the coil L1 side is shown. G1 designates a NAND gate receiving as inputs the inverted signal of a phase drive signal S1 by an inverter G3 and a phase drive signal S3, and G2 denotes a NAND gate receiving as inputs the inverted signal of the phase drive signal S3 by an inverter G4 and the phase drive signal S1. The outputs of these gates are used for the switching of transistors Tr1 and Tr2, respectively.

Figure 5:
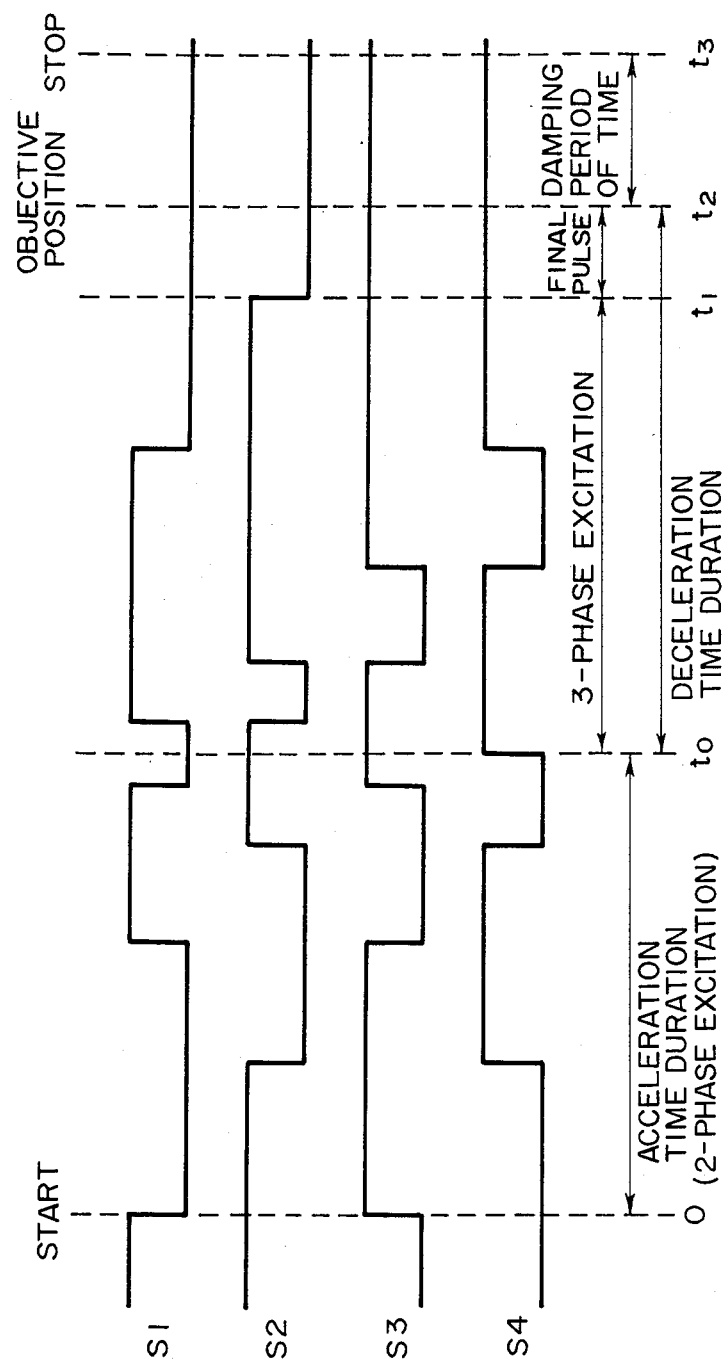
FIG. 5 is a timing chart showing an example of the operation timing of the signal of each portion shown in FIG. 4.

Thus, when the coil L1 is not driven even if the signal S1 or S3 is energized, the transistors Tr1 and Tr2 are not rendered conductive by gates G1–G4, but an electric current generated by a counter electromotive force flows through the route of Tr5→ground→D6→coil L1→Tr5 or the route of Tr6→ground→D5→coil L1→Tr6. Although not shown in FIG. 4, the coil L2 side may also be of a similar construction. The operation timing of the signal of each portion in the present embodiment is such as shown in FIG. 5.

In the present embodiment, design is made such that from the point of time at which acceleration changed over to deceleration, a loop current begins to flow to the winding which is not concerned in driving, but alternatively, design may of course be made such that the loop current begins to flow during acceleration or after the lapse of a predetermined time after the shift to the deceleration time duration interval and also, the present invention is of course applicable to a case where the stepping motor is trapezoidally driven such as driven in the form of acceleration-equal speed-deceleration.

Further, the above-described two embodiments have been shown with respect to a case where during stoppage, the 4-phase stepping motor is driven in a mode in which it is 2-phase or 3-phase excited, but of course, the present invention can also be very effectively applied to a case where, for example, during stoppage, the 4-phase stepping motor is driven in a mode in which it is 1-phase excited or in other mode, or to other motors than the 4-phase stepping motor.

As is apparent from the foregoing description, according to the present invention, the deceleration time duration interval and damping time can be easily shortened with the stepping motor controlled by the open loop control and therefore, complicated closed loop control in which a position detector or the like is added becomes unnecessary and accordingly, compactness and inexpensiveness of a control system which can operate the stepping motor at a high speed can be realized.

I claim:

1. A control method for a stepping motor comprising:
   driving said stepping motor during a first time duration;
   subsequently, during a second time duration, driving said stepping motor in a one phase-on mode and flowing a loop current to a coil of the phase which was not concerned in the driving of said stepping motor in each excitation interval of the one phase-on mode, thereby obtaining a braking force; and
   bringing said motor to an objective position in a third time duration.

2. A control method according to claim 1, wherein said stepping motor is bipolarly driven.

3. A control method according to claim 1, wherein said loop current flows by short-circuiting the opposite ends of said coil.

4. A control method according to claim 1, wherein said loop current flows by grounding the opposite ends of said coil.

5. A stepping motor driving apparatus comprising:
   drive means for flowing an electric current to coils of one or more phases of said stepping motor in succession during a first time duration; and
   control means for driving said stepper motor during a second time duration in a one phase-on mode and forming a closed loop by the coil of the phase to which the electric current was not flowed by said drive means in each excitation interval of said one phase-on mode, said control means being constructed and arranged to bring said motor to an objective position during a third time duration.

6. A stepping motor driving apparatus according to claim 5, wherein said control means comprises a CPU and a switching transistor.

7. A stepping motor driving apparatus according to claim 5 further comprising a read only memory connected to said control means to define said second time duration.

8. A stepping motor driving apparatus according to claim 5, wherein said closed loop is a loop including a grounded level.

9. A stepping motor driving apparatus comprising:
   first switch means for flowing an electric current to a coil of said stepping motor or inhibiting the same;

second switch means for forming a closed loop current path including said coil of said stepping motor; and control means for ON/OFF—controlling said first switch means during an acceleration time duration of said stepping motor; for ON/OFF—controlling said first switch means and said second switch means in a time duration following said acceleration time duration such that said motor is driven in a one phase-on mode and a closed loop in formed by the coil of a phase to which electric current is not flowed via said first switch means in each excitation interval of said one phase-on mode; and for ON/OFF—controlling said first switch means during a subsequent time duration to bring said motor to an objective position.

10. A stepping motor driving apparatus according to claim 9, wherein two of said first switch means are provided to flow an electric current to a coil in forward and reverse directions.

11. A stepping motor driving apparatus according to claim 9 or 10, wherein said first switch means is a switching transistor.

12. A stepping motor driving apparatus comprising:
first switch means provided at opposite ends of a coil of said stepping motor to control the application of a voltage to said coil;
second switch means provided at the opposite ends of said coil to enable an electric current to be flowed to said coil by the voltage applied to the coil of said stepping motor; and
control means for controlling said first switch means and said second switch means so as to form a closed loop by said second switch means and said coil during one phase-on stepper motor excitation intervals in which driving current is not flowed to said coil, said control means being constructed and arranged to control said switch means to subsequently bring said motor to an objective position.

13. A stepping motor driving apparatus according to claim 12, wherein said first switch means and said second switch means include switching transistors.

14. A stepping motor driving apparatus according to claim 12, wherein said first switch means is provided between a power source and said coil, and said second switch means is provided between said coil and ground.

15. A stepping motor driving apparatus according to claim 12, wherein two of said first and second switch means each are provided for a coil of said stepping motor, and said first switch means and said second switch means are controlled by signals from two output terminals of said control means.

16. A control method for stepping motor according to claim 1 wherein said driving of said stepping motor during a first time duration is carried out in at least a two phase-on mode.

* * * * *

UNITED STATES PATENT AND TRADEMARK OFFICE
CERTIFICATE OF CORRECTION

PATENT NO. : 4,746,847                  Page 1 of 2
DATED : May 24, 1988
INVENTOR(S) : NORIYUKI KIKUGAWA It is certified that error appears in the above-identified patent and that said Letters Patent is hereby corrected as shown below: On the title page:

AT [57] IN THE ABSTRACT

"6 Claims, 5 Drawaing Sheets" should read --16 Claims, 5 Drawing Sheets--.

COLUMN 1

Line 31, "close" should read --closed--.

COLUMN 2

Line 16, "driven In" should --driven. In--.

COLUMN 3

Line 23, "drivers two" should read --driver--.

COLUMN 4

Line 47, "stepper" should read --stepping--.
Line 59, "claim 5" should read --claim 5,--.

COLUMN 5

Line 8, "in" should read --during--.
Line 10, "in" should read --is--.

UNITED STATES PATENT AND TRADEMARK OFFICE
CERTIFICATE OF CORRECTION

PATENT NO. : 4,746,847

DATED : May 24, 1988

INVENTOR(S) : NORIYUKI KIKUGAWA

It is certified that error appears in the above-identified patent and that said Letters Patent is hereby corrected as shown below:

COLUMN 6

Line 6, "stepper" should read --stepping--.
Line 25, "claim 1" should read --claim 1,--.

Signed and Sealed this

Eighth Day of November, 1988

Attest:

DONALD J. QUIGG

Attesting Officer

Commissioner of Patents and Trademarks